Patented Feb. 26, 1924.

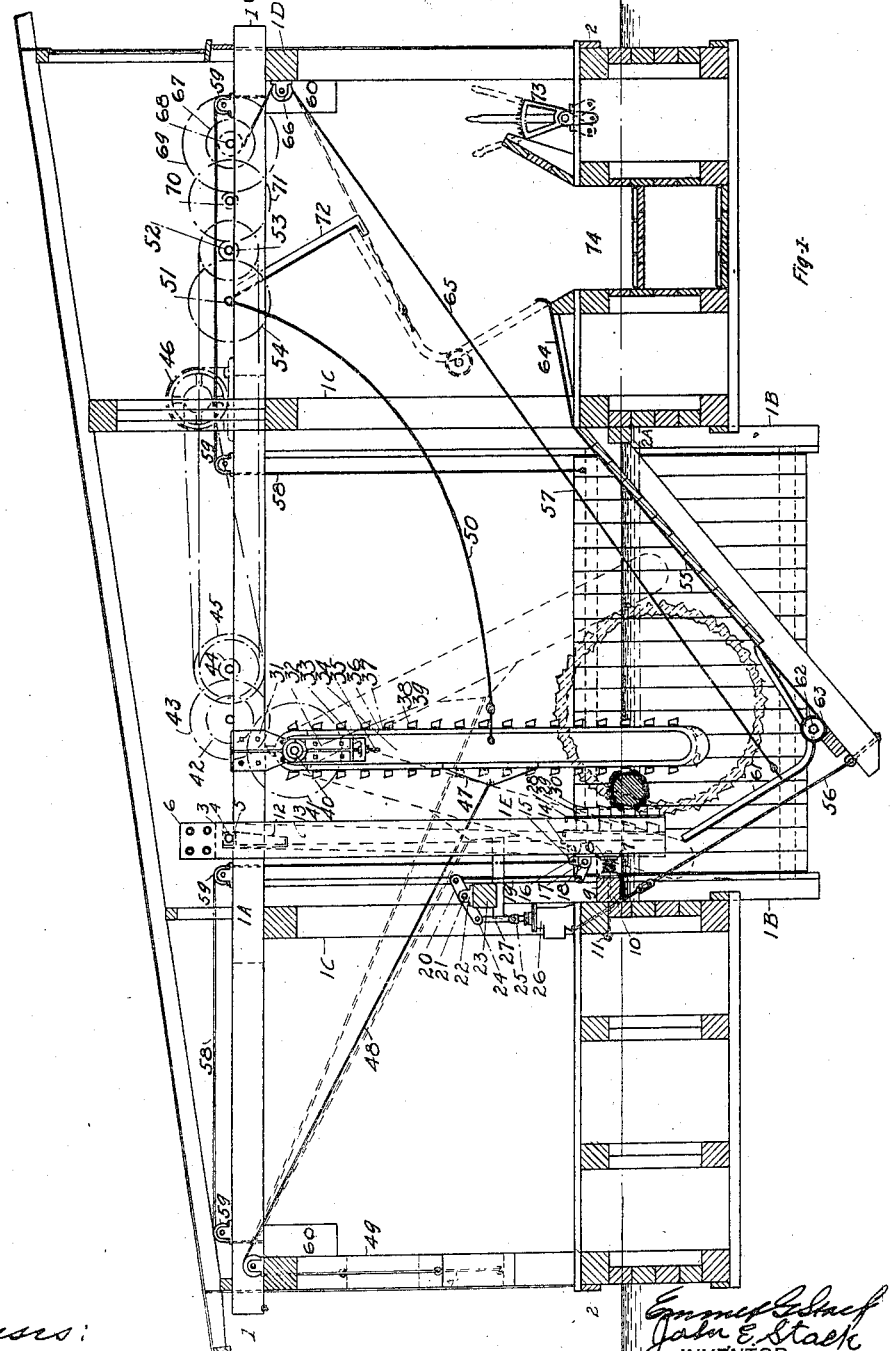

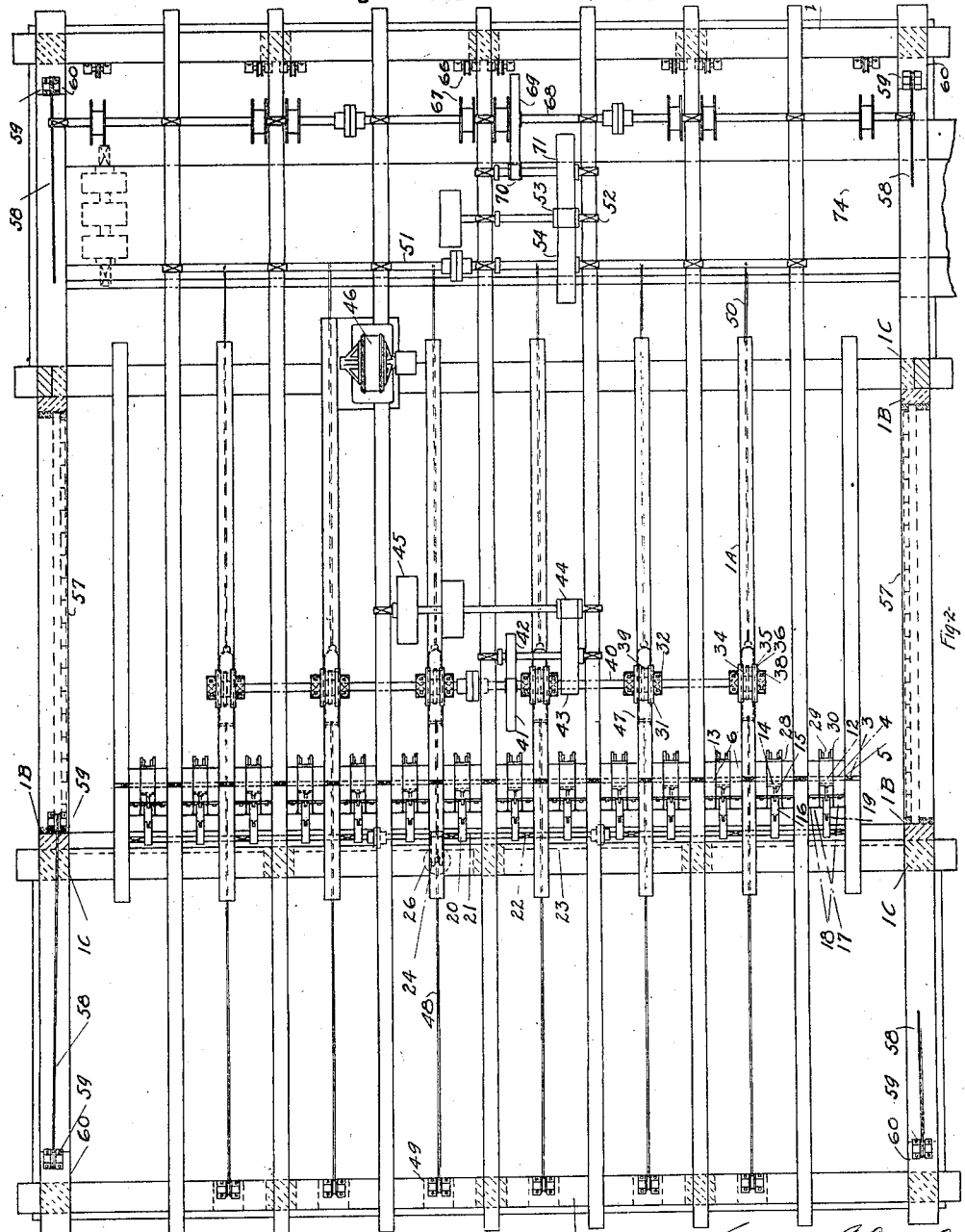

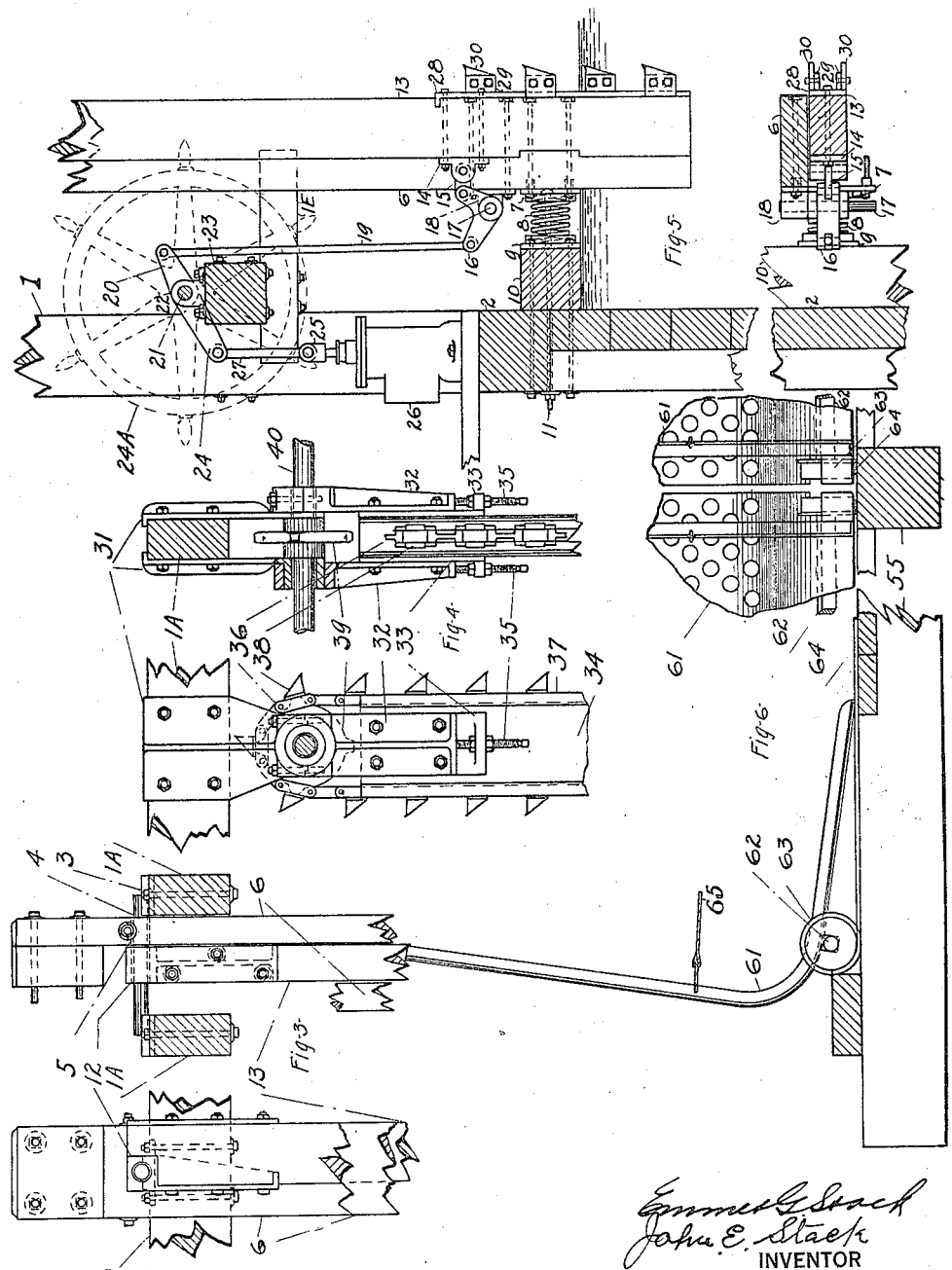

1,484,912

UNITED STATES PATENT OFFICE.

EMMET G. STACK AND JOHN E. STACK, OF MARSHFIELD, OREGON.

LOG-BARK-PEELING MACHINE.

Application filed December 10, 1921, Serial No. 521,405. Renewed July 19, 1923.

*To all whom it may concern:*

Be it known that we, EMMET G. STACK, a citizen of the United States, residing at Marshfield, in the county of Coos and the State of Oregon, and JOHN E. STACK, a citizen of the United States, residing at Marshfield, in the county of Coos and the State of Oregon, have invented a new and useful Log-Bark-Peeling Machine, of which the following is a specification.

Our invention relates to a machine for peeling the bark from the huge logs of any diameter, length, shape, or thickness of bark, as found on the Pacific coast. A machine to take logs of any description as they come to it at the mill pond and to accomplish the debarking process mechanically in a quick, cheap, and efficient manner.

The results obtained: first, a saving of at least ninety per cent in labor costs; second, a better fire risk in the woods; third, no loss of logs from burning the bark débris around them prior to hauling; fourth, more speed in logging; fifth, elimination of rock and gravel imbedded in log during hauling which causes damaged saws, poor lumber, and loss of time; sixth, an increase of ten to twenty per cent in mill cut; seventh, better grade of lumber as sawyer can see the exact condition of log; eighth, bark with a commercial value can be recovered at a point where it can be done on a paying basis.

Our invention relates to a log bark-peeling machine constructed on a foundation, which permits a predetermined fixed relation between the operating members and the water level in the log-supply, log-operating, and log-discharge basins, to be maintained. A suitable superstructure carrying shafting from which are suspended a series of hinged units, in number, sufficient to work over the longest log contemplated at one operation. Each unit consists of one or more buffer-bars and one or more tooth-bars which are cushioned and yield to the varying contours of the log together, but independently as units. The tooth-bar is adjustable to varying thickness of bark and equipped with detachable girdling and ripping teeth. A series of hinged adjustable chain-bars carrying a driven chain with detachable teeth work in conjunction with the tooth-bars by rotating the log against them in the water of an operating basin enclosed by adjustable end-gates; a ramp supporting a series of gleaners that clear the water of the operating basin of bark, as they are hauled to a self-dumping position, emptying it into a suitable conveyor.

I attain these ends by the mechanism illustrated in the accompanying drawings, in which—

Figure 1 is a section thru the machine as constructed on a floating scow; Fig. 2, plan view; Fig. 3, detail of top of buffer and tooth bar units; Fig. 4, detail of chain-bar unit; Fig. 5, detail of bottom of buffer and tooth-bar unit; Fig. 6, detail of bark gleaner.

Similar numerals refer to similar parts thruout the several views.

A suitable superstructure 1 constructed on a floating scow, pontoon or raft where water level varies, as on scow shown in 2 Fig. 1, or on piling or other stationary foundation where water level varies little.

A series of bearings 3 carried on timber $1^A$ of superstructure 1 support the ends of trunnions 4 to which are suspended on suitable bushings or bearings 5 two buffer-bars 6 bolted together to swing as a unit. Lower end of buffer-bars 6 are fastened together by yoke 7 which carries one end of compression spring 8 the other end of which is held by cup 9 bolted to timber 10 of foundation 2. The buffer-bars 6 yield and are cushioned by spring 8 when struck by log. Forward motion of buffer-bars 6 is regulated by bolt 11. Suspended between buffer-bars 6 on bearing 12 from trunnion 4 is tooth-bar 13. Tooth-bar 13 can be swung on trunnion 4 clear of water so as to facilitate the changing of teeth. To the lower end of tooth-bar 13 is bolted bell-mouth 14 connected by link 15 to one jaw of bell-crank 16 hinged on shaft 17 carried in bearings 18 bolted to back of buffer-bars 6. Connecting rod 19 links other jaw of bell-crank 16 to rocker-arm 20 keyed to rocker-shaft 21 carried in bearings 22 bolted to timber 23 of superstructure 1. Cylinder-arm 24 keyed to rocker-shaft 21 connects with cross-head 25 of steam or air-cylinder 26 thru connecting-rod 27. Cylinder 26 is equipped with a three-way valve to enable tooth-bar 13 thru its various connections to be extended, receded, or held in any position forward or back of the face of the buffer-bars 6 within the limits of its travel. By this means the tooth-bar 13 can be set out for any thickness of bark and receded for cleaning the teeth of bark. On rocker-shaft 21 is keyed hand-wheel $24^A$ shown in Fig. 5 to be used in case air or steam supply is cut off. Each unit consisting of buffer-bars 6 and tooth-bar 13 yield together, but independently of the other units of the series when forced by log regardless of whether buffer-bars 6 or tooth-bar 13 is struck. To the lower front face of tooth-bar 13 is bolted the plate 28 with lugs 29 to which are bolted detachable teeth 30 made with chisel face except two teeth on alternate units which are ground to knife-edge so as to girdle log and facilitate the work of chisel-face teeth by cutting the bark into sections. I prefer to construct the units as outlined and shown in Fig. 1, Fig. 2, Fig. 3, Fig. 4, Fig. 5, but one or more buffer-bars or one or more tooth-bars may be used in combination in a unit; also, the order of the operation of gauging the teeth for the varying thickness of bark may be reversed. A suitably driven shaft, from which both separably mounted buffer-bar and tooth-bar units 6 and 13, respectively, and chain-bar units 34 can be vertically suspended, may be substituted for shafting 4 and shafting 40 may be done away with. The number of units are to be sufficient to work over the longest log contemplated, in one operation.

On each side of timber 1$^A$ of superstructure 1 (see Figs. 1 and 4) is bolted bearings 31. On the outside of hub of bearing 31 hinges the split hanger 32 bolted to sole-plate 33 on chain-bar 34. By means of adjusting screw and nuts 35 on sole-plate 33 the chain-bar 34 can be adjusted and held to length of chain 36. Chain-race 37 is bolted around chain-bar 34. Detachable chisel-face teeth 38 are bolted to chain 36 which runs over split sprocket 39 keyed to shaft 40 between bearings 31. Shaft 40 is driven by gear 41, pinion 42, iron friction 43, thru paper friction 44 driven by power transmitted by belt from motor 46. To the sides of chain-race 37 are bolted the plates 47, designed to shear off bark clinging to chains, to which are fastened cables 48 to weight-box 49 which automatically brings chain-bar 34 into position between the buffer-bar units and back of the bark-gleaners 61 and up against stops 1$^E$ bolted to timber 23 of superstructure 1, (which also serve as guides for the buffer-bar units) when haul-back cable 50 is slacked and there are no logs in the way, thus enabling bark-gleaners 61 to be put in operation. The haul-back cables 50 are fastened to stirrups on the back of chain-bars 34 and to winding-shaft 51 which is stopped and started by slide-box 52 forcing the driven paper friction 53 against the iron friction 54 keyed to the winding-shaft 51. The winding-shaft 51 can be held in any position by suitable brake applied to iron friction 54. See Fig. 1, for chain-bars in various positions.

The foundation 2 consists of two sections separated by a log-operating basin which is made V-shaped by a ramp 55, the upper end of which is supported on timber 2$^A$ of one section of foundation 2, and the lower end suspended by rods 56 from the other section. The ramp 55 extends between the independently adjustable end-gates 57 which slide in ways 1$^B$ attached to posts 1$^C$ of superstructure 1 and which are controlled by cables 58 working over sheaves 59 to counterweights 60. The two sides of the V-shaped log-operating basin are formed by the ramp 55, the upper end of which is covered, and a series of V-shaped bark-gleaners 61 of a suitable frame covered with perforated plates. The bark-gleaner frame 61 is attached to axles 62 carrying wheels 63 running on track 64 of ramp 55. These wheels 63 are placed in such a position on the bark-gleaner frame 61, that working in conjunction with haul-up cable 65 they cause the end of bark-gleaners 61 to scrape over the covered portion of the ramp 55 as they are hauled up into a self-dumping position. The bark-gleaners 61 in their travel separate all the bark from the water in the log-operating basin, and dump it into a suitable conveyor 74. The haul-up cables 65 attached to bark-gleaners 61 run over sheaves 66 attached to timber 1$^D$ of superstructure 1 onto drums 67 keyed to shaft 68 driven thru gear 69, pinion 70, iron friction 71, thru driven paper friction 53 actuated by slide-box 52. The shaft 68 can be held in any position by a suitable brake applied to iron friction 71. The travel of the bark-gleaners 61 is regulated by the stops 72. All slide-boxes, brakes on frictions, and valves, are connected by a suitable system of connections to the levers in the operator's nest 73.

The peeling operation is as follows: Chain-bar units 34 are hauled back enough to allow the log to enter and are held; end-gate 57 on supply-basin's side raised; a log is floated in; both end-gates 57 lowered; chain-bar units 34 are lowered against log, and the cables 50 still further slacked. When power is supplied to chain 36 the log is caused to rotate down against the teeth 30 of the tooth-bars 13 which have been set out for the thickness of bark on log, and which tear the bark off being aided by the teeth 38 on chain 36. The log is kept rotating in the water at all times. A tendency to climb is checked by hauling back on cables 50 enough to drop the log, or, by receding tooth-bars 13 behind the face of buffer-bars 6. As the bark piles up between the log and the tooth-bar units 13 the tooth-bars 13 are receded behind the face of buffer-bars 6 and the log kept rotating, which action carries the bark down under the log and to the rear. The buffer-bar 6 and the chain-bar units 34 constantly change their position as they keep yielding to the changing contour of the log surface in its rotation. After peeling, the chain-bars 34 are hauled back and held; the end-gate 57 on the log-discharge basin side is first raised, the log pushed out, and then lowered; haul-back cable 50 is slacked allowing counterweight 49 to bring chain-bars 34 into position between buffer-bar units 6 and back of bark-gleaners, 61 which are then hauled up and dumped. On being lowered into place, the chain-bars 34 are hauled back to receive another log, and the process repeated.

We claim:

1. A log bark-peeling machine comprising a foundation parts of which are spaced to form such an intervening basin as will fill when the foundations are immersed or surrounded by a body of water, to the level of said body, and will permit a log to be floated into or out of said basin; a superstructure supported on said foundations; peeling means so suspended from the superstructure that the lower portions extend below the surface of the water in the basin to a pre-determined depth so as to engage a floating log of any diameter on diametrically opposite sides at or near its horizontal center line, and operable to rotate the log on its axis of floatation and scrape the same.

2. A log bark-peeling machine comprising a floating foundation parts of which are spaced to form an intervening basin which will fill to the level of the surrounding body of water upon which the foundation is floated; a superstructure supported on said foundation; peeling means so suspended from the superstructure that the lower portions extend below the surface of the water in the basin to a pre-determined depth so as to readily engage a floating log of any diameter on diametrically opposite sides at or near its horizontal center line, and operable to rotate the log on its axis of floatation and scrape the same.

3. A log bark-peeling machine comprising a foundation parts of which are spaced to form such an intervening basin as will fill when the foundations are immersed or surrounded by a body of water, to the level of said body, and will permit a log to be floated into or out of said basin; a superstructure supported on said foundation carrying means for engaging opposite sides of a floating log at or near its horizontal center line, for rotating it about its axis of floatation and for scraping the same, consisting of bearings carrying two parallel lines of shafting from one of which is suspended a series of buffer and tooth-bar units and from the other a series of chain-bar units, the lower portion of the units of both series extending below the water level of the basin to a pre-determined depth so as to readily engage a log of any diameter on diametrically opposite sides at or near its horizontal center line floated between them and to be free to yield independently to the varying contour of the rotating log as units of the several series and the chain-bar units operable to rotate the floating log about its axis of floatation and to scrape the same in conjunction with the buffer and tooth-bar units; end-gates independently operable to close the entrance and exit to the basin; a series of bark-gleaners operable to form the bottom of the basin in conjunction with a partly covered ramp over which they operate when engaged in clearing the basin of bark and dumping it into suitable conveyors.

4. In a log bark-peeling machine; a series of operating buffer and tooth-bar units and a series of operable chain-bar units, in numbers sufficient to operate over the longest log contemplated in one operation, both series vertically suspended from hinged bearings on separate parallel lines of shafting carried in bearings on a superstructure and extending below the surface of water enclosed in a basin formed by the several parts of the foundation mounted by the superstructure; a means operable for causing a variable space to be formed between the submerged portions of both series of units and adjustable to any diameter log floated between them; a means consisting of two independently operable end-gates for closing the entrance and exit of said basin and for confining the loose bark therein until separated from the water in the basin and deposited in suitable conveyors by a series of operable bark-gleaners.

5. In a log bark-peeling machine; a series of units, each unit consisting of one or more vertically suspended hinged buffer-bars and one or more vertically suspended hinged tooth-bars with detachable teeth; a means for connecting and cushioning the bars at lower end; a means for receding the tooth-bars behind the buffer-bars, or the reverse; suitable connections between the bars and the power applied.

6. In a log bark-peeling machine; a series of units, each unit consisting of an adjustably hinged chain-bar vertically suspended from the hub of bearings which are suspended from the superstructure, and which carry a suitably driven shaft; a split sprocket; a chain with detachable chisel-face teeth; a chain-race; a bark shear and stop; a means for moving and holding the unit in any desired position substantially as shown and for the purpose as set forth in the specification.

7. In a log bark-peeling machine; a series of units, each unit consisting of two buffer-bars and a tooth-bar between them suspended on hinged bearings from a trunnion shaft which turns in bearings carried on superstructure; a yoke tying the bottom end of the buffer-bars and spanning the tooth-bar, supporting a coil compression spring; bearings on the buffer-bars carrying a shaft with a bell-crank connected by a link to a bell-mouth on tooth-bar; a tooth-bar plate with lugs to which are bolted chisel-face and knife-edge teeth; a connecting-rod which links the bell-crank with the rocker-shaft actuated by a suitable means substantially for the purpose as set forth in the specifications.

8. In a log bark-peeling machine; a V-shaped adjustably enclosed operating basin containing water; adjustable end-gates and a means for their operation; a series of V-shaped bark-gleaner frames, without ends, covered with perforated plates and mounted on one axle and two wheels to the unit; a track; a partly covered supporting ramp which with the gleaners form the sides of the basin; a means for applying power in hauling gleaners up the ramp into a self-dumping position.

9. A log bark-peeling machine comprising a foundation parts of which are spaced to form such an intervening basin as will fill when the foundations are immersed or surrounded by a body of water, to the level of said body, and will permit a log to be floated into or out of said basin; a superstructure supported on said foundations; a bark-peeling means consisting of two separate series of units in an operable combination; a unit of one of said series comprising a trunnion shaft which turns in bearings on the superstructure; two buffer-bars fastened together at their upper ends through a spreader, suspended on bearings from the trunnion shaft, connected at their lower ends by a yoke spanning a tooth-bar with detachable teeth; said tooth-bar suspended on a hinged bearing from the trunnion-shaft between the buffer-bars; compression springs supported by said yoke; a bearing on the back of buffer-bars carrying a shaft with a bell-crank connected by a link to a bell-mouth on back of tooth-bar and by a connecting-rod to a cam on rocker-shaft actuated by a cylinder with a three-way valve so as to cause the tooth-bar to be moved and held forward or back of the face of the buffer-bars for the purposes and as set forth in the specifications; a unit of the other of said series comprising an operable shaft parallel to the trunnion shafts of the other series and turning in bearings suspended from the superstructure; split sprockets keyed to said shaft between a pair of its bearings; a chain-bar; a chain-race for a chain with detachable teeth operating around the chain-bar and over the driving sprocket at the head end; adjustable hinged bearings suspended from the hubs of drive-shaft bearings and fastened to the chain-bars; an operable means for hauling back the chain-bars so as to permit a log to be floated in between them and the units of the other series and said log to be engaged at or near a horizontal line thru its center by the teeth of the travelling chain and causing it to rotate on its axis of floatation down against the teeth on the tooth-bar on the diametrically opposite side, and by this combined action scraping the log.

EMMET G. STACK.
JOHN E. STACK.

Witnesses:
ANTHONY N. EBERHART,
RICHARD N. McCARTHY.